United States Patent
Alt et al.

(10) Patent No.: US 10,553,031 B2
(45) Date of Patent: Feb. 4, 2020

(54) DIGITAL PROJECT FILE PRESENTATION

(71) Applicant: Microsoft Technology Licensing, LLC, Redmond, WA (US)

(72) Inventors: Gregory L. Alt, Seattle, WA (US); Laura K. Sugden, Redmond, WA (US); Shih-Sang Carnaven Chiu, Seattle, WA (US); Maxime Ouellet, Kirkland, WA (US); Denise Ng, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/833,918

(22) Filed: Dec. 6, 2017

(65) Prior Publication Data
US 2019/0172261 A1    Jun. 6, 2019

(51) Int. Cl.
G06T 19/00     (2011.01)
G06F 3/01      (2006.01)
G10L 15/26     (2006.01)

(52) U.S. Cl.
CPC ............ G06T 19/006 (2013.01); G06F 3/011 (2013.01); G10L 15/26 (2013.01)

(58) Field of Classification Search
CPC .................................................. G06T 19/006
See application file for complete search history.

(56) References Cited

U.S. PATENT DOCUMENTS

| | | |
|---|---|---|
| 8,624,725 B1 | 1/2014 | MacGregor |
| 2007/0208610 A1* | 9/2007 | Pisaris-Henderson ...................... G06Q 30/0207 705/14.1 |
| 2009/0081959 A1 | 3/2009 | Gyorfi et al. |

(Continued)

FOREIGN PATENT DOCUMENTS

| | | |
|---|---|---|
| WO | 2014188393 A1 | 11/2014 |
| WO | 2017123410 A1 | 7/2017 |

OTHER PUBLICATIONS

"Autodesk Maya and Microsoft HoloLens: Amazing Demo", Retrived From: <<https://www.youtube.com/watch?v=yADhOKEbZ5Q>>, Jun. 13, 2015, 1 Page.

(Continued)

*Primary Examiner* — Jeffery A Brier
(74) *Attorney, Agent, or Firm* — Alleman Hall Creasman & Tuttle LLP

(57) ABSTRACT

Examples are disclosed that relate to representing a digital project file. One example provides a computing device comprising a logic device and a storage device holding instructions executable to obtain a digital project file comprising a geometric representation of a real physical space, and a user-created annotation associated with a location in the representation. The instructions are further executable to display a representation of the file in a first rendering format, receive a request to display a representation of the file in a second rendering format in which one or more real surfaces of the real physical space are displayed as a virtual rendering, the one or more real surfaces not being displayed as the virtual rendering the first digital rendering format, and, in response to the request, display the representation of the file in the second format.

20 Claims, 10 Drawing Sheets

(56) References Cited

U.S. PATENT DOCUMENTS

| | | | |
|---|---|---|---|
| 2010/0081416 A1 | 4/2010 | Cohen | |
| 2010/0257252 A1 | 10/2010 | Dougherty et al. | |
| 2012/0249591 A1 | 10/2012 | Maciocci et al. | |
| 2013/0335405 A1 | 12/2013 | Scavezze et al. | |
| 2014/0002498 A1 | 1/2014 | Lee et al. | |
| 2014/0055491 A1* | 2/2014 | Malamud | H04W 4/21 345/633 |
| 2014/0145914 A1 | 5/2014 | Latta et al. | |
| 2014/0253743 A1 | 9/2014 | Loxam et al. | |
| 2014/0306866 A1 | 10/2014 | Miller et al. | |
| 2014/0306993 A1 | 10/2014 | Poulos et al. | |
| 2014/0333666 A1 | 11/2014 | Poulos et al. | |
| 2015/0040040 A1 | 2/2015 | Balan et al. | |
| 2015/0084855 A1 | 3/2015 | Song et al. | |
| 2015/0091780 A1 | 4/2015 | Lyren | |
| 2015/0215611 A1 | 7/2015 | Wu et al. | |
| 2015/0269783 A1 | 9/2015 | Yun | |
| 2016/0054793 A1 | 2/2016 | Kasahara et al. | |
| 2016/0140761 A1 | 5/2016 | Saunders et al. | |
| 2016/0321841 A1 | 11/2016 | Christen et al. | |
| 2016/0379408 A1 | 12/2016 | Wright et al. | |
| 2017/0323480 A1* | 11/2017 | LaBarca | G01S 13/885 |
| 2018/0176474 A1* | 6/2018 | Blanco | H04N 5/23293 |
| 2018/0253219 A1* | 9/2018 | Dotan-Cohen | G06F 16/907 |
| 2018/0293602 A1* | 10/2018 | Glazier | G06Q 30/0214 |

OTHER PUBLICATIONS

"iPal: Capture Pictures and Videos with Your Eyes and Share with Blinks or Wink!", Retrieved From: <<https://www.indiegogo.com/projects/ipal-capture-pictures-and-videos-with-your-eyes-and-share-with-blinks-or-wink#/>>, Jul. 3, 2014, 22 Pages.

"Meta Space Glasses: The Killer of Google Glass?", Retrieved From: <<http://intersog.com/blog/augmenled-reality/meta-space-glasses-the-killer-of-google-glass/>>, Mar. 20, 2015, 3 Pages.

"New Virtual-Holographic Display Tool for Designers and Architects: zSpace [video]", Retrieved From: <<http://freshome.com/2012/07/18/new-virtual-holographic-display-tool-for-designers-and-architects-zspace-video/#ixzz3V8dMI8Av>>, Jul. 20, 2012, 15 Pages.

"Non-Final Office Action Issued in U.S. Appl. No. 14/746,693", dated Sep. 16, 2016, 39 Pages.

"Non-Final Office Action Issued in U.S. Appl. No. 14/746,693", dated May 16, 2017, 44 Pages.

Barde, Snehlata, "Innovation of New World; Integration of Virtual Object in Real World", In International Journal of Application or Innovation in Engineering & Management, vol. 2, Issue 3, Mar. 2013, pp. 85-89.

Eadicicco, Lisa, "This Is What It Will Be Like to Use Microsoft's Futuristic New Wearable Computer, The Hololens" Retrieved From: <<http://www.businessinsider.in/This-Is-What-It-Will-Be-Like-To-Use-Microsofts-Futuristic-New-Wearable-Computer-The-Hololens/articleshow/45972861.cms>>, Jan. 22, 2015, 6 Pages.

Jones, et al., "RoomAlive: Magical Experiences Enabled by Scalable, Adaptive Projector-Camera Units", In Proceedings of 27th ACM User Interface Software and Technology Symposium, Oct. 5, 2014, pp. 637-644.

Kasahara, et al., "Second Surface: Multi-user Spatial Collaboration System based on Augmented Reality", In Proceedings of 5th ACM SIGGRAPH Conference and Exhibition on Computer Graphics and Interactive Techniques in Asia, Nov. 28, 2012, 4 Pages.

Tsang, et al., "Boom Chameleon: Simultaneous capture of 3D viewpoint, voice and gesture annotations on a spatially-aware display", In Proceedings of the 15th annual ACM symposium on User interface software and technology, UIST '02, Oct. 27, 2002, 10 Pages.

Wassom, Brian, "Augmented Reality By Any Other Name: Still as Sweet?", Retrieved From <<http://www.wassom.com/augmented-reality-by-any-other-name-still-as-sweet.html>>, Mar. 6, 2015, 3 Pages.

"International Search Report and Written Opinion Issued in PCT Application No. PCT/US18/062375", dated Feb. 18, 2019, 12 Pages.

* cited by examiner

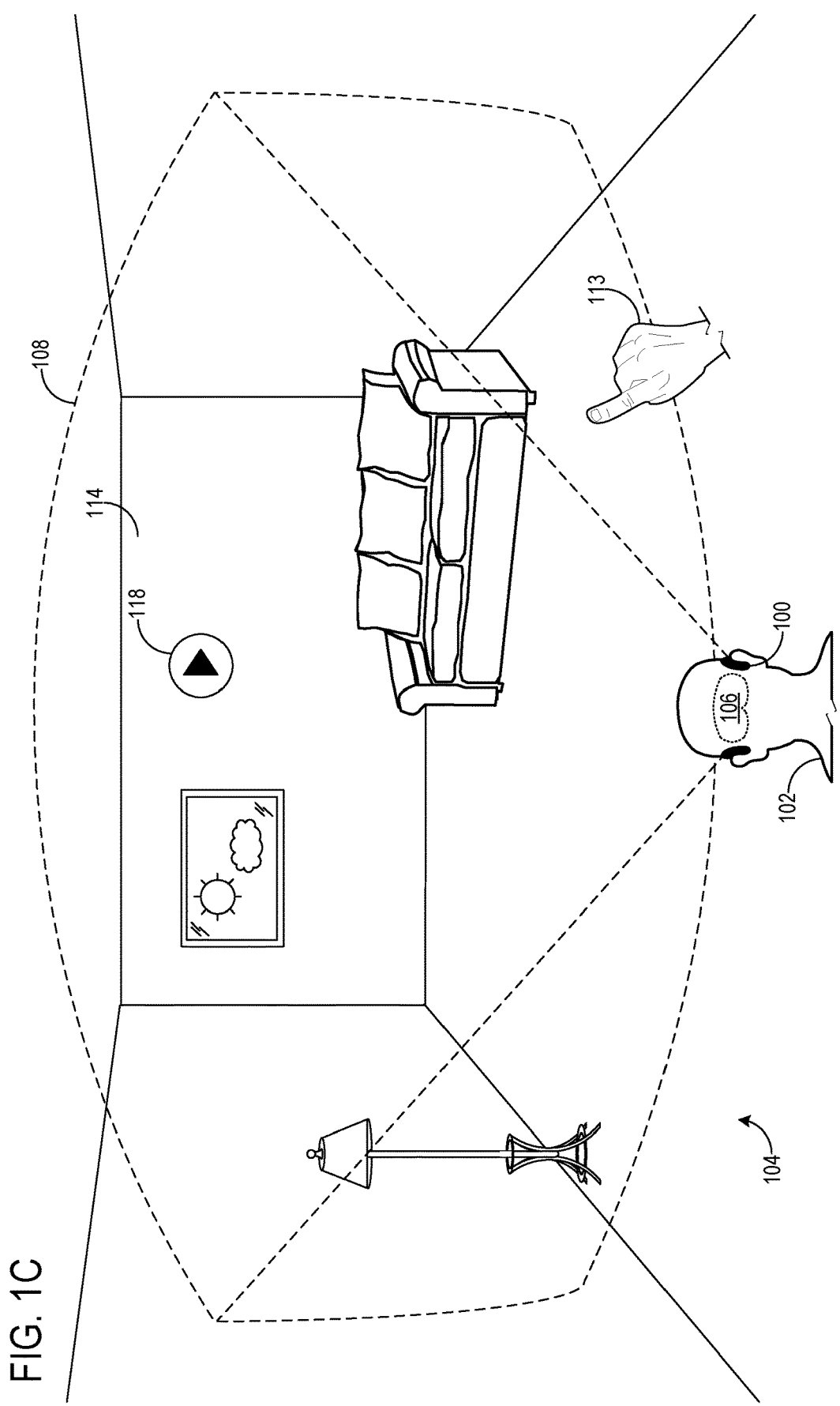

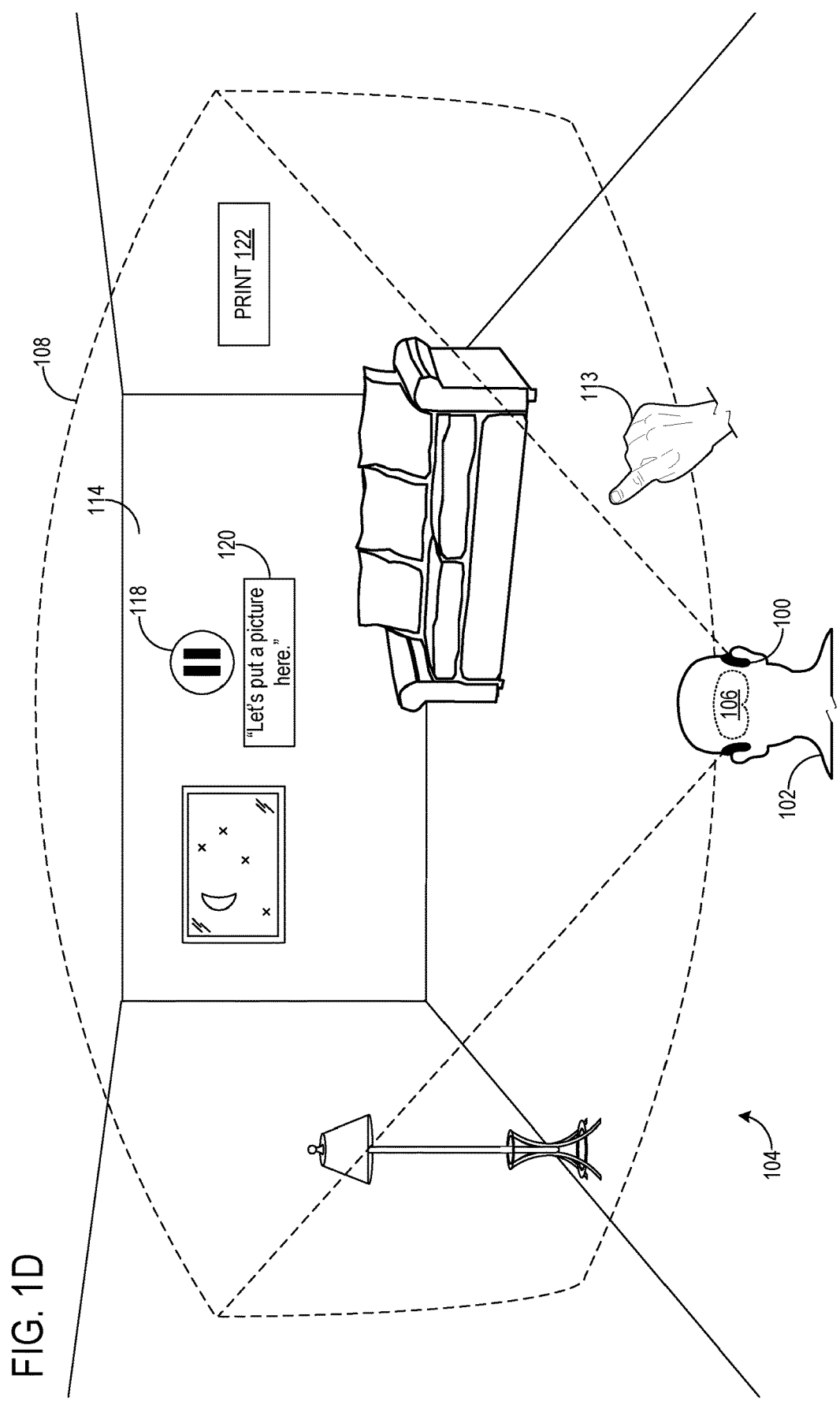

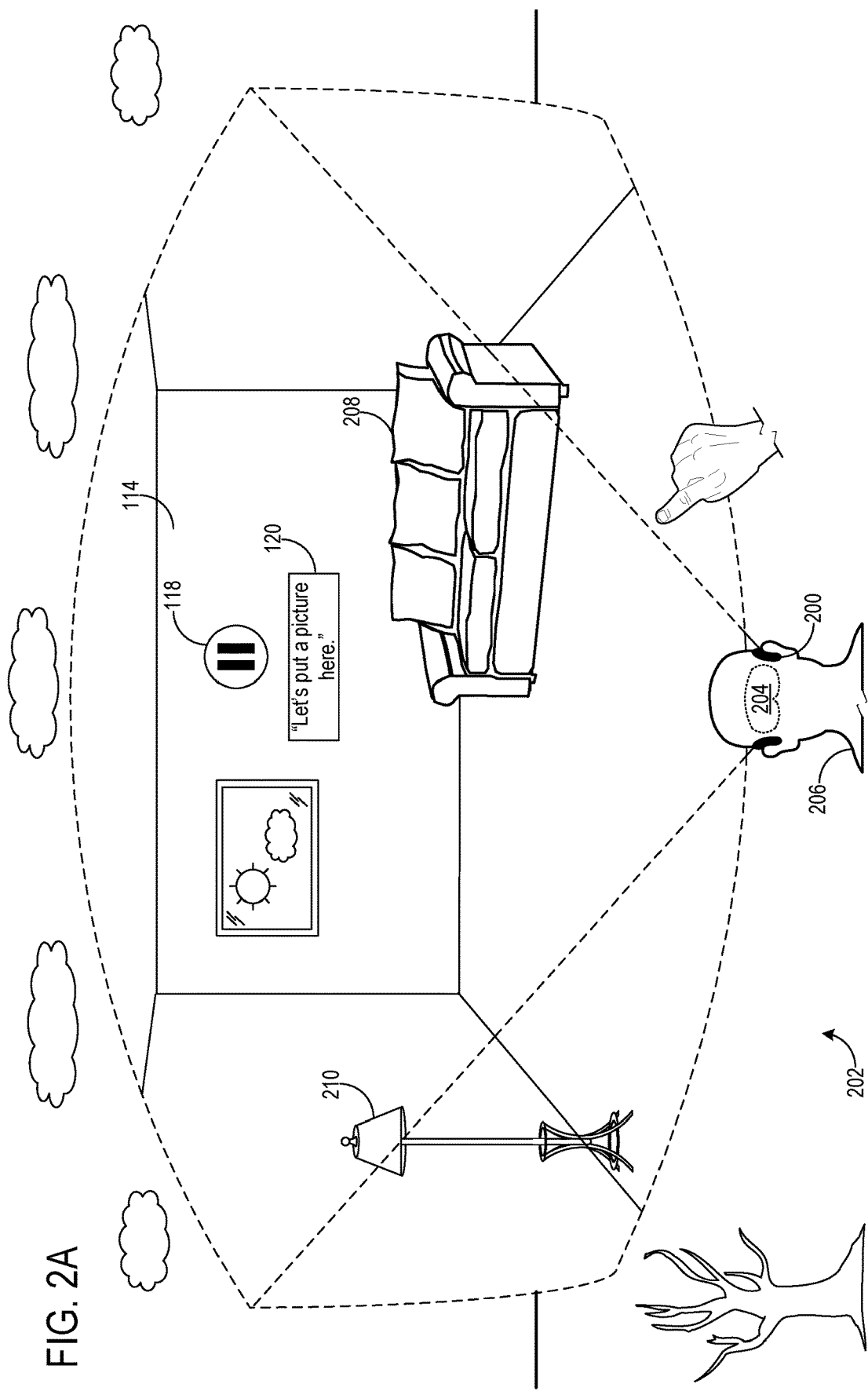

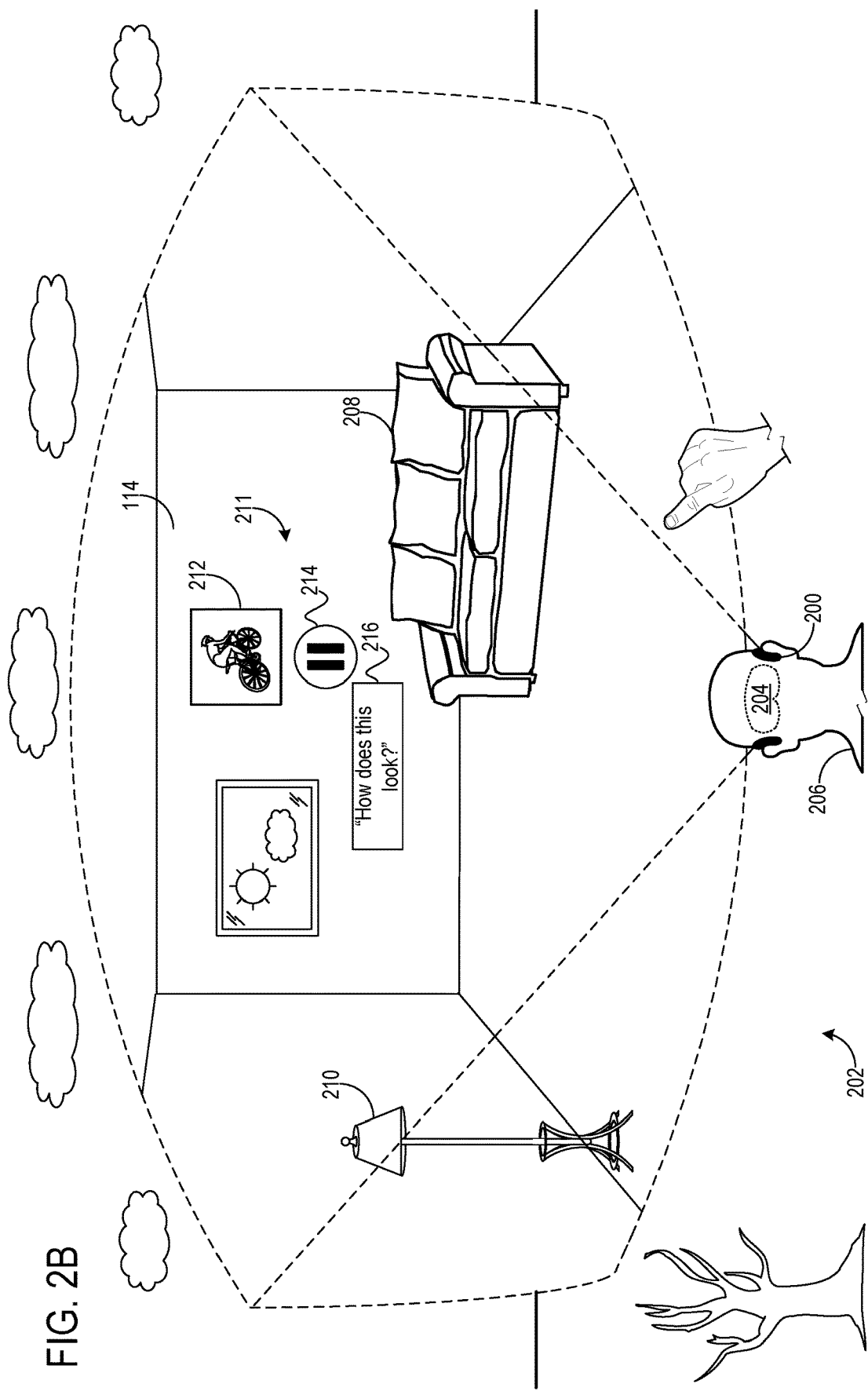

DIGITAL PROJECT FILE PRESENTATION

BACKGROUND

Virtual imagery may be presented in many different manners. For example, a near-eye display device may be configured to present virtual images as mixed reality images or virtual reality images. Mixed reality images are virtual images displayed with a view of a surrounding physical environment, whereas virtual reality images present an immersive virtual environment in lieu of a view of the physical environment.

SUMMARY

Examples are disclosed that relate to presenting a digital project file. One example provides a computing device comprising a logic device and a storage device holding instructions executable to obtain a digital project file comprising a geometric representation of a real physical space, and a user-created annotation associated with a location in the representation. The instructions are further executable to display a representation of the file in a first rendering format, receive a request to display a representation of the file in a second rendering format in which one or more real surfaces of the real physical space are displayed as a virtual rendering, the one or more real surfaces not being displayed as the virtual rendering the first digital rendering format, and, in response to the request, display the representation of the file in the second format.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A-1D illustrate an example scenario in which a user creates an annotation for a mixed reality project file.

FIGS. 2A-2B illustrate an example scenario in which the user-created annotation is displayed on a virtual reality display device.

DETAILED DESCRIPTION

Figure 1A:
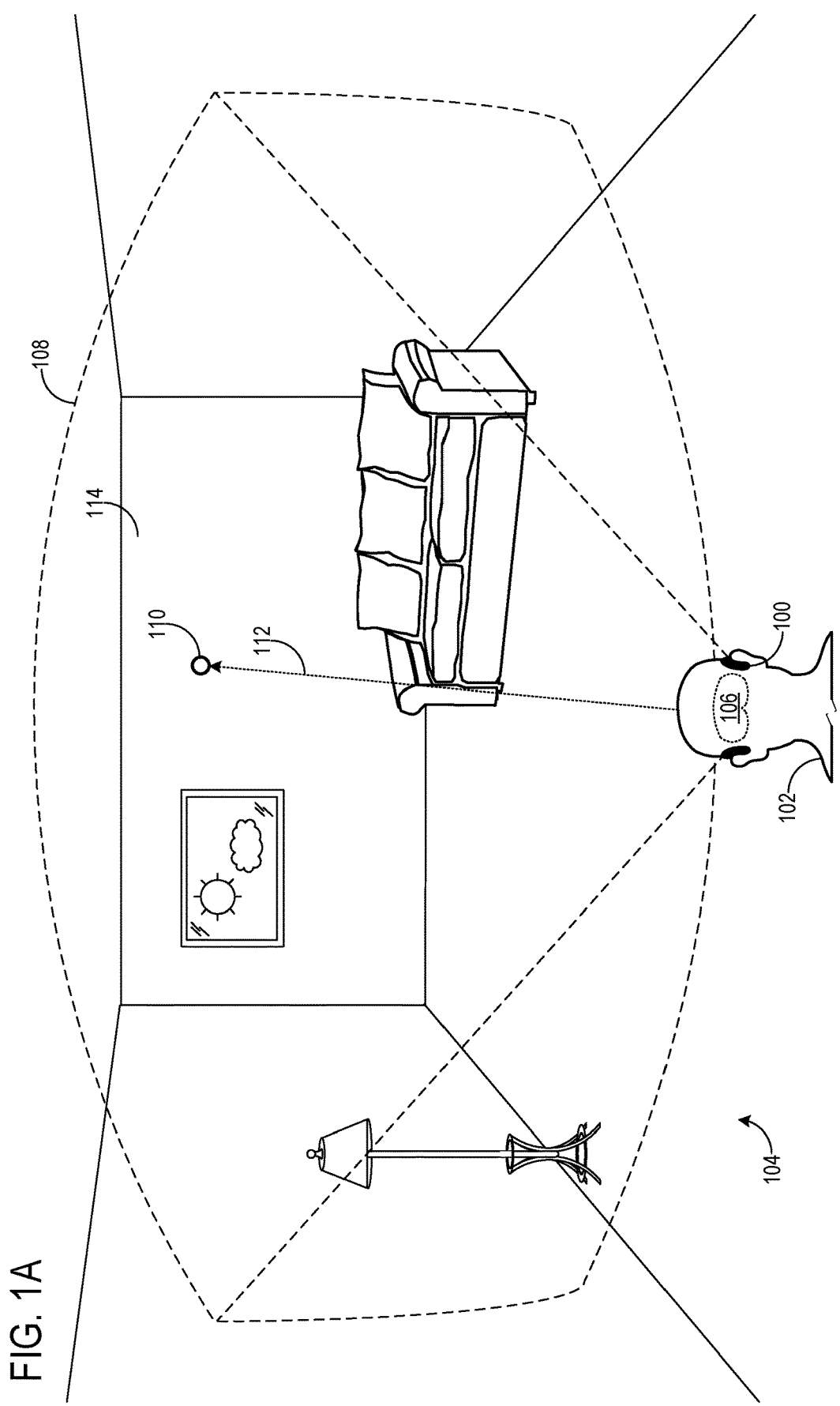

On a mixed reality (MR) see-through display device such as a see-through head-mounted display (HMD) device, virtual imagery is composited with real imagery viewable through the display. A virtual image may be associated with a specific location in a three-dimensional model of the real-world environment (e.g. a surface reconstruction formed from point cloud data acquired by a depth camera) to maintain the virtual image at an intended fixed location relative to the real-world.

A user of an MR display device may be able to create virtual imagery associated with specific real-world locations in the three-dimensional model and save the virtual imagery in a project file for later viewing and/or further editing. Users also may be able to create annotations associated with virtual or real objects. Such annotations may be saved in the project file, and may take the form of text, audio, video, recorded user gestures, recorded user interactions with an input device, and/or other suitable types of content associated with a specific location in the real-world environment for later presentation to the creator or other users, e.g. to communicate a message to a different user of the project file.

However, the presentation of such an MR project file on other devices or in other environments may pose challenges. For example, a user viewing the MR project file in a different physical environment may find an annotation unclear, due to the annotation being presented in a physical environment different from the one in which it was created. Similar issues may arise when viewing the MR project file on a virtual reality (VR) HMD that blocks the physical environment from being viewed directly.

Accordingly, examples are disclosed herein that relate to presenting representations of a digital project file including a user-created annotation in different device and physical contexts. As described below, a user-created annotation may be displayable as an MR virtual image and form part of a digital project file that also includes a geometric representation of a real physical space. The digital project file may be displayed in first and second digital rendering formats that differ from each other, where one or more real surfaces of the real physical space are displayed as a virtual rendering in the second format and not in the first format, allowing for example an MR image to be displayed as a VR image. In this way, an annotation can be shared across user sessions, different devices and platforms, while preserving the spatial and contextual association between the annotation and physical environment in which it was created.

FIGS. 1A-1D illustrate an example scenario in which a user-created annotation is displayed. In the example, an MR display device in the form of an HMD device 100 presents MR imagery to a user 102 occupying an example use environment 104. Use environment 104 is depicted as a home environment, but may be any other suitable environment. Via a see-through stereoscopic display 106, HMD device 100 displays the MR imagery in a field of view (FoV) 108 as superimposed over a view of the real-world environment as seen through the see-through display 106. FoV 108 may be substantially coextensive with, greater than, or less than the FoV of the eyes of user 102. Detail regarding the configuration and function of an example HMD device is provided below with reference to FIG. 6.

FIG. 1A represents an initial stage in the process of creating an annotation. HMD device 100 displays a virtual image of a cursor 110 controllable via a gaze direction 112 of user 102. Cursor 110 may be displayed as though it travels along surfaces in environment 104, appearing anchored to the environmental surfaces as user 102 changes gaze direction 112. In one example, HMD device 100 may determine, via image data from one or more inward-facing image sensors, an angular orientation of one or both eyes of user 102, project a gaze vector outwardly based on the angular orientation(s), determine where the gaze vector intersects the geometric representation (e.g. a surface reconstruction mesh) of use environment 104, and display the cursor at a location based on this intersection. Any other suitable mechanism may be used to control the location of cursor 110, such as a handheld controller configured to sense motion with three degrees of freedom (e.g., three translational or rotational degrees of freedom) or with six degrees of freedom (e.g., three translational degrees of freedom, three rotational degrees of freedom), or by sensing via HMD device 100 the location of a hand of user 102 (e.g., via an outward-facing image sensor of the HMD device). Cursor 110 indicates where an annotation can currently be placed, as described in further detail below.

In some implementations, HMD device 100 may be configured to form the geometric representation of a use environment. Thus, as described in more detail below, HMD device 100 may include or otherwise communicatively couple to one or more sensor(s), such as depth sensors, for gathering geometric data regarding the use environment. In one example, HMD device 100 acquires point cloud data from a depth sensor (i.e. an array of distance values at x,y pixel locations), forms a surface reconstruction mesh comprising an array of polygons from the point cloud data, identifies major surfaces from the mesh, and then associates one or more identified major surfaces in environment 104 with one or more corresponding definitions of the surfaces (e.g. "wall") via user input (e.g., a pointing gesture combined with a voice command identifying the major surface). In some examples, polygons of a surface reconstruction mapped to a surface may be resolved into a simpler representation comprising a reduced number of polygons. For example, HMD device 100 may resolve polygons mapped to a planar surface into a single rectangle representing the planar surface. In other examples, a previously formed geometric representation may be aligned to a physical environment via one or more geometric transformations, including but not limited to translation and/or rotation. For example, a virtual surface of the geometric representation, where the virtual surface represents a wall (e.g., of a remote physical environment in which the representation was created), may be aligned to a wall in a physical environment in which the representation is being viewed. In some examples, this alignment may guide the alignment of other virtual surfaces to the physical environment. The alignment process may be carried out manually via user input, or in other examples may be partially or fully automated by a computing device such as HMD device 100.

In yet other examples, a geometric representation may be formed from a virtual reality project file based upon the relative locations and scale of objects in the project file. Such a digital project file may not have a specific corresponding physical environment, but may be fit to a current physical environment of a user (e.g. a room in which a user is located) by adjusting dimensions of the virtual geometric representation to match those of a current physical environment (e.g. by scaling walls and floors of the geometric representation of the virtual project file to match the floors and walls of a current physical environment that are identified as described above).

Figure 1B:
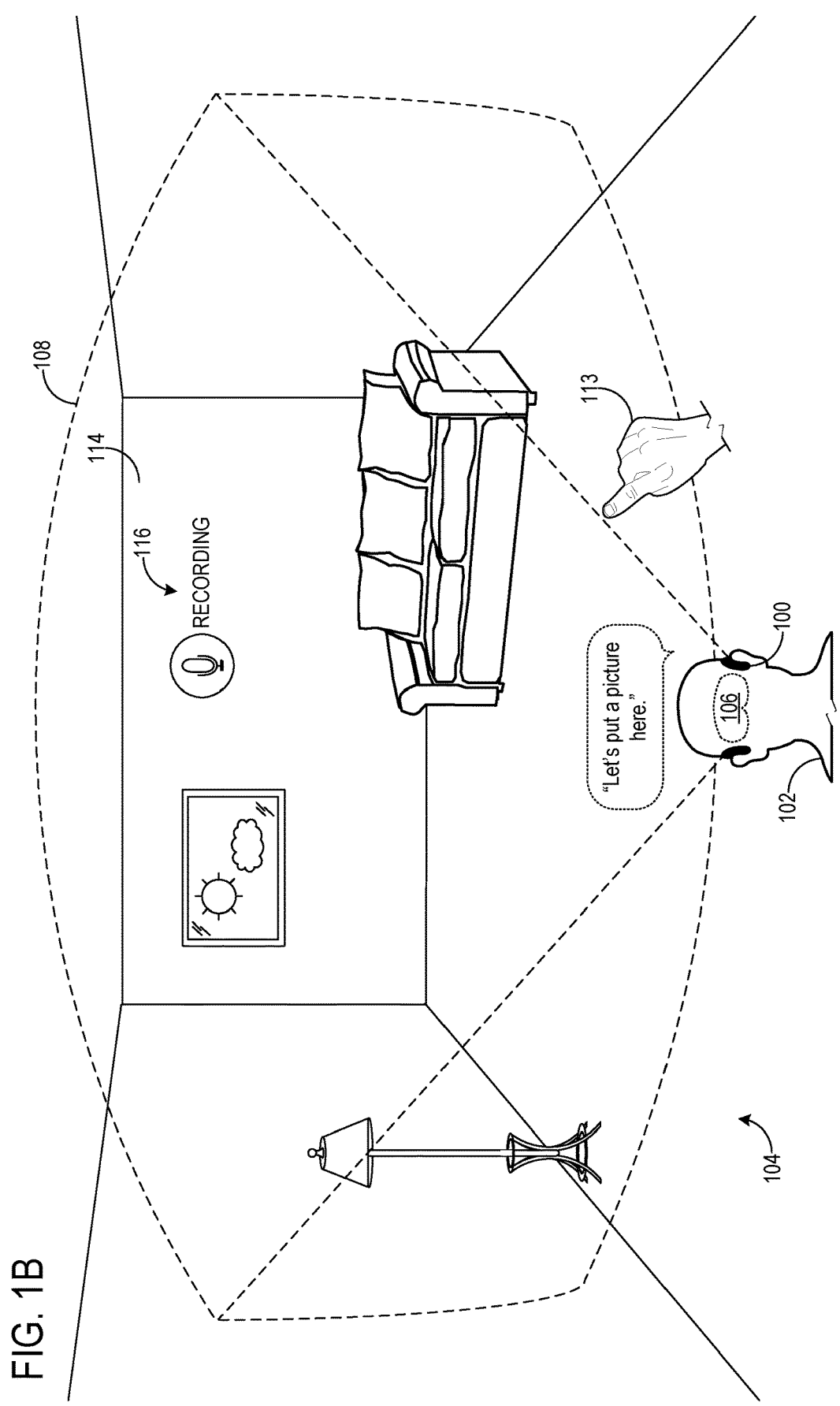

With cursor 110 positioned at a desired location such as a wall 114 of environment 104, user 102 may initiate creation of an annotation. As shown in FIG. 1B, in one example, user 102 extends the index finger of a hand 113 to perform a so-called "air tap" hand gesture, which HMD device 100 may detect via outward-facing image sensor(s) (e.g., stereo or depth), for example. In other examples, another suitable gesture may be used, such as a tap of a finger against another finger, or another body part (e.g. another hand), or another mode of input (e.g. voice command, head gesture) may be used. In yet other examples, a peripheral input device such as a handheld controller may be used to initiate creation of the annotation. The controller may assume any suitable form, and in some examples may sense motion with three or six degrees of freedom. In response to the hand gesture, HMD device 100 displays virtual imagery in the form of an icon 116 indicating that user 102 may record speech for inclusion in the annotation. FIG. 1B depicts the utterance by user 102 of "let's put a picture here," which HMD device 100 may record via one or more microphones.

In FIG. 1C, user 102 has completed the utterance of the speech recorded as the annotation. User 102 may cease recording of speech in any suitable manner, such as by another hand gesture (e.g., by retracting the index finger, performing another air tap or other hand gesture), issuing a voice command, and/or by ceasing speech for a threshold duration, as examples. In response to completing the voice recording, HMD device 100 displays virtual imagery in the form of a control 118 that is selectable to output a representation of the voice recording.

The display of the annotation as a virtual image of control 118 may persist across user sessions on HMD device 100. Thus, user 102 may end the user session in which the annotation is created, and return to HMD device 100 to view the annotation in a subsequent user session. FIG. 1D shows the selection of control 118 by user 102 during a subsequent user session, which causes HMD device 100 to output a representation of the voice recording associated with the control. HMD device 100 may output different representations of the voice recording depending on whether the voice recording meets various conditions. For example, when the voice recording meets a first condition, HMD device 100 may playback the audio of the voice recording, and when the voice recording meets a second condition, the HMD device may display a text transcription (e.g., caption 120) of the voice recording. The first condition may include the voice recording being less than a threshold duration, in which case playback may be suitable. The second condition may include the voice recording being greater than a threshold duration, in which case text transcription may permit faster consumption of the voice recording than playback. More generally, a detected condition (e.g. voice message duration or transcribed voice message length) may be compared to a policy regarding the condition (e.g. a threshold duration or transcribed length), and the presentation mode for the annotation may be selected based on the comparison to the policy.

A digital project file including the annotation may be shared with other display devices located in different physical environments. FIG. 2A illustrates an example scenario in which the annotation is presented on a VR HMD device 200 in a different use environment 202 than the environment 104 in which the annotation and project file were created. In this example, control 118, which is displayed via a substantially opaque, stereoscopic display 204 of VR HMD device 200, is selected by a user 206, causing display of caption 120 and a transcription of the voice recording of the annotation. In other examples, the annotation may be presented via audio output, rather than or in addition to text.

In some examples, aspects of use environment 104 in which the annotation was created also are displayed via HMD device 200. In the depicted example, various surfaces of use environment 104 such as wall 114 are displayed as a virtual rendering. The virtual rendering of the wall may, for example, be produced from a simplified rectangular representation of the wall as a major surface, or from a mesh representation of the wall as a plurality of polygons. Such data may be stored as a part of the project file to facilitate the display of the virtual rendering. In this manner, the spatial association of the annotation with the use environment 104 in which it was created may be more clearly communicated in other presentation contexts that do not permit the presentation of the MR rendering of the project file.

The digital project file may further comprise image data allowing HMD device 200 to visually reproduce an appearance of features of use environment 104, such as an appearance of wall 114. The image data may be applied, for example, as textures to one or more surfaces in a geometric representation to represent an actual appearance of wall 114. To this end, HMD device 100 may include one or more image sensors configured to collect image data of use environment 104, such as an RGB camera. As shown in FIG. 2A, the digital project file also may include data allowing the representation of the appearance of one or more objects other than major surfaces in use environment 104, such as a sofa 208 and a lamp 210.

In the example of FIGS. 1A-1D, an annotation is associated with a real object, namely, a wall. In other examples, an annotation may be associated with a virtual object. FIG. 2B shows an annotation 211 associated with a virtual object 212 created by user 206 via HMD device 200. Annotation 211 comprises a control 214 selectable to output a representation of a voice recording made by user 206 regarding virtual object 212, where the representation includes a caption 216 with a text transcription of the voice recording. By creating and annotating virtual object 212, user 206 has thereby responded to the annotation of user 102 regarding placement of a picture. The updated digital project file including virtual object 212 and annotation 211 may then be shared with HMD device 100 for presentation of annotation 211.

An annotation may take any suitable form. As examples, an annotation may comprise image data (e.g., two or three-dimensional image data such as image data associated with virtual object 212), audio data (e.g., a voice recording such as that associated with control 118), text data, and/or video data. In some examples, an annotation may comprise recorded user interactions, including but not limited to user gestures, and/or user interaction with an input device. For example, a recorded user gaze location or pointing location associated with a user gesture or user control of an input device may be recorded and represented in the annotation. As a specific example, the drawing of virtual imagery via a handheld input device may be recorded and visually represented in the annotation (e.g., as the final drawing and/or played back as the drawing was made). Further, an annotation may be presented in different annotation formats depending on factors such as a type of device used to present the annotation. For example, where an annotation includes a hyperlink to a website, the annotation may be presented as an image of the website on a larger display to allow information on the website to be viewed, or as a text hyperlink on a smaller display where information on the website would be too small to easily view. Likewise, in the instance of an audio annotation, an annotation may be presented in audio format or in text format depending, for example, on a length of the annotation and a type of device (e.g. mixed reality, mobile phone, etc.) on which the annotation is presented.

FIGS. 1A-1D represent an example in which a representation of a digital project file is presented in a first digital rendering format, and FIGS. 2A-2B represent an example in which a representation of the digital project file is presented in a second digital rendering format. The depicted first and second digital rendering formats differ in that, in the second format, one or more real surfaces of use environment 104 such as wall 114 are displayed as a virtual rendering on HMD device 200, whereas the virtual renderings of these surfaces are not displayed in the first format. Further, the examples depicted in FIGS. 1A-2B illustrate the display of representations of the digital project file via three-dimensional imagery, which may allow users 102 and 206 to change their orientation and/or location to observe different portions of virtual imagery through suitable user inputs. Other representations of the digital project file via three-dimensional imagery are possible, such as via display on a two-dimensional display device (e.g., computer monitor, mobile phone, tablet, laptop, etc.) or non-head-mounted three-dimensional display device (e.g., holographic projector). In some examples, the digital project file may include a three-dimensional video recorded as use environment 104 is traversed. In some such examples, the three-dimensional video may be a 360° panoramic video.

Figure 3:
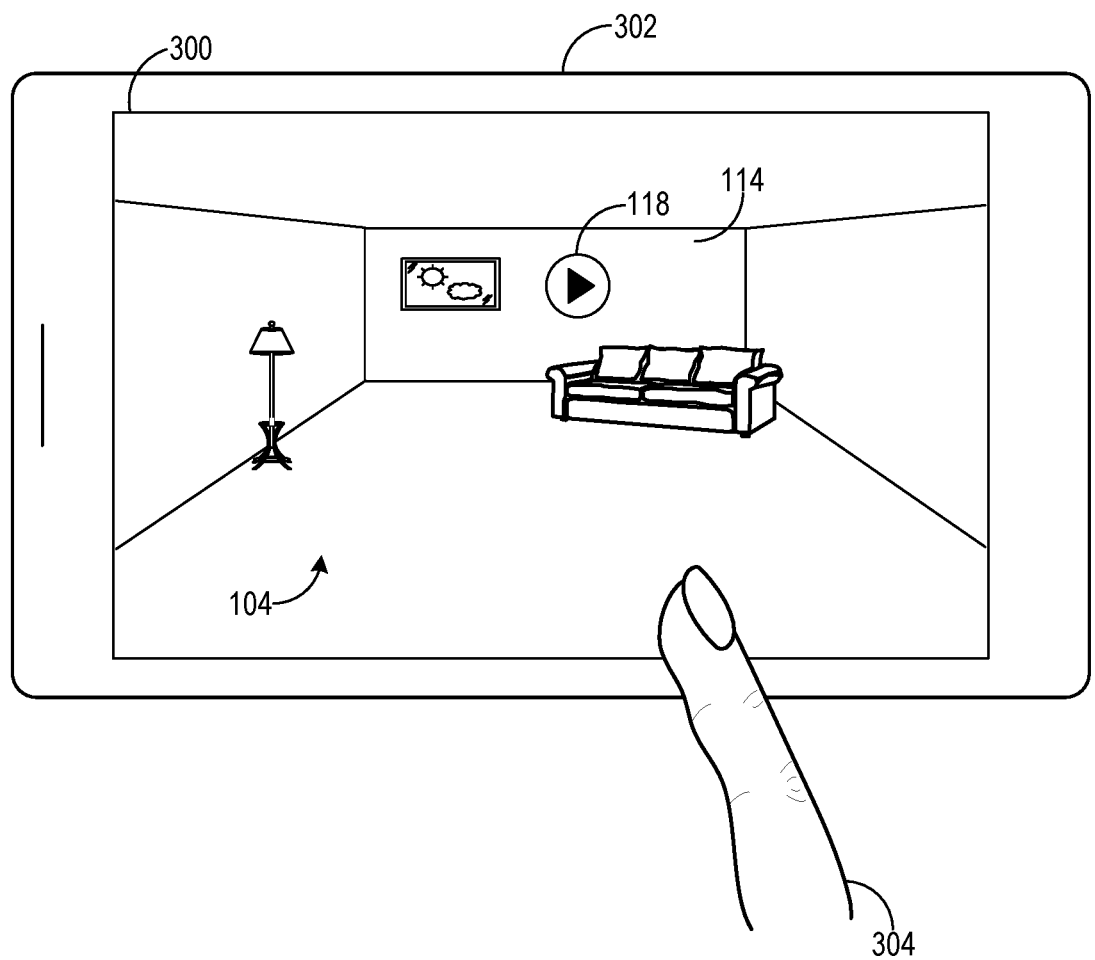
FIG. 3 shows an example two-dimensional presentation of a digital project file on a two-dimensional display device.

FIG. 3 depicts a display 300 of a mobile computing device 302 displaying the digital project file as two-dimensional imagery, and displaying control 118 for outputting a representation of the voice annotation. The two-dimensional imagery may comprise a two-dimensional representation of use environment 104 and associated virtual imagery, which in some examples may be scrollable to view other portions of the image, such as by touch interaction via a finger 304. In other examples, the two-dimensional imagery may comprise a plan view, or a two-dimensional video recorded as use environment 104 is traversed by user 102 or by a virtual camera.

Figure 4:
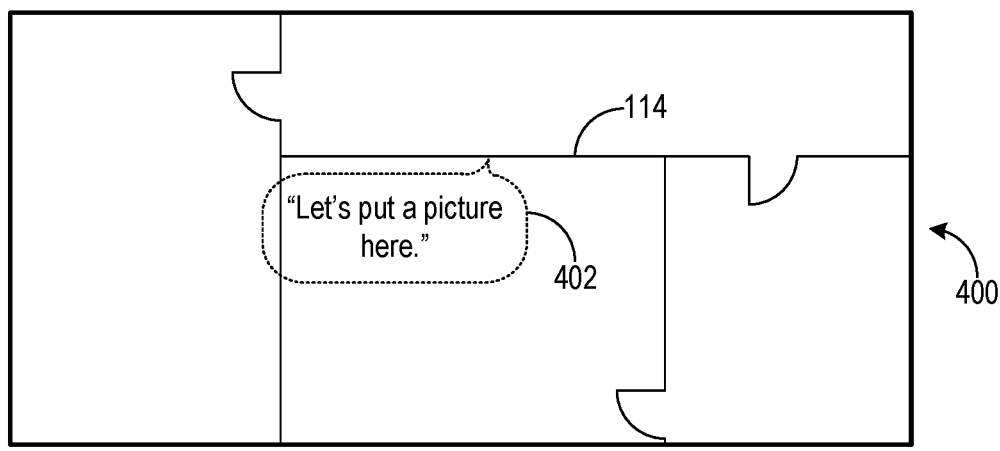
FIG. 4 shows another example two-dimensional presentation of a digital project file.

A digital project file also may be rendered in a plan representation based, for example, on the major surfaces identified in the geometric representation. FIG. 4 shows an example two-dimensional representation of the digital project file in the form of a plan view 400, wherein wall 114 and other surfaces of the use environment are represented via lines from a plan perspective. Such a view may be generated when a user selects to print a project file, for example, and may be referred to herein as a "printable representation" in that the plan view shows a layout of the project file that captures aspects that otherwise may not be easily viewable in a single image from the perspective of a virtual camera.

Plan view 400 further comprises a representation of the voice recording associated with the annotation that was created in use environment 104, in the form of a text transcription 402 of the voice recording. Transcription 402 is located at a position within plan view 400 corresponding to the location in which the annotation was created in use environment 104. This may help a user to understand the spatial association between the annotation and use environment when viewing the representation of the digital project file in printed form.

Plan view 400 may be generated in any suitable manner. As one example, FIG. 1D shows the display on HMD device 100 of a control 122 selectable to generate plan view 400. The locations of surfaces and other aspects (e.g. doors, objects) of use environment 104 may be based on identifications of the aspects as learned from user definition of the aspects (as described above) and/or from automated feature classification (e.g. using a trained machine learning function, such as a convolutional neural network, to classify depth and/or image data collected by HMD device 100).

Other representations of a digital project file are also possible. As described above, the digital project file associated with use environment 104 may include a two or three-dimensional video of the use environment being traversed, which may be recorded via outward-facing image sensor(s) on HMD device 100 and composited with rendered virtual imagery to form a mixed reality recording. In other examples, data regarding the head pose of user 102 and HMD device 100 may be recorded to determine the perspective of a virtual camera from which a virtual rendering of use environment 104 is rendered, and in which one or more surfaces visible from the perspective of the virtual camera are displayed as a virtual rendering. In yet other examples, use environment 104 may be virtually rendered from virtual camera perspectives that do not correspond to the perspective of user 102 or HMD device 100. In still other examples, a virtual camera may be used to render a representation of user 102, such as an avatar, in a displayed representation of a project file. Here, movement, actions, head pose, eye gaze, interactions with a digital project file, and/or any other suitable data regarding user 102 may be recorded and used to control the avatar and/or present virtual imagery. The virtual camera may be used to generate any suitable representation of use environment 104, including but not limited to a two-dimensional representation, three-dimensional representation, printable representation, and/or video.

As mentioned above, the annotation may be presented in a number of different forms. In one example, annotation(s) may be presented with an indication of the real and/or virtual object(s) with which the user who created the annotation interacted, e.g. by highlighting such objects during presentation. Further, for examples in which a digital project file includes multiple annotations, an enumeration of the annotations (e.g., number, content, length, type, location) may be provided so that a user can easily view the content of and/or metadata regarding the annotations (e.g. author, date created, etc.). In some examples, an annotation in one digital project file may comprise a control selectable to present a representation of another digital project file. For example, a digital project file may be provided for an exhibit in a museum, and may include an annotation having a control associated with a bust that is selectable to display a representation of another digital project file that includes additional detail regarding the bust.

As mentioned above, in some examples an annotation may be associated with a specific location within a physical environment by a user gesture indicating the location. In other examples, other input modes, such as voice, may be used to associate an annotation with a location in an environment. As a more specific example, portions of a geometric representation of an environment may undergo semantic labeling. In such labeling, a user may provide inputs (e.g. voice plus pointing), or classification methods may be used, to identify one or more surfaces and/or other features of the physical environment, for example as a chair, sofa, television, window, living room wall, etc. With physical environment features labeled, a user then may instruct, via a voice command or any other suitable user input, the association of an annotation to one or more of the labeled features.

Figure 5:
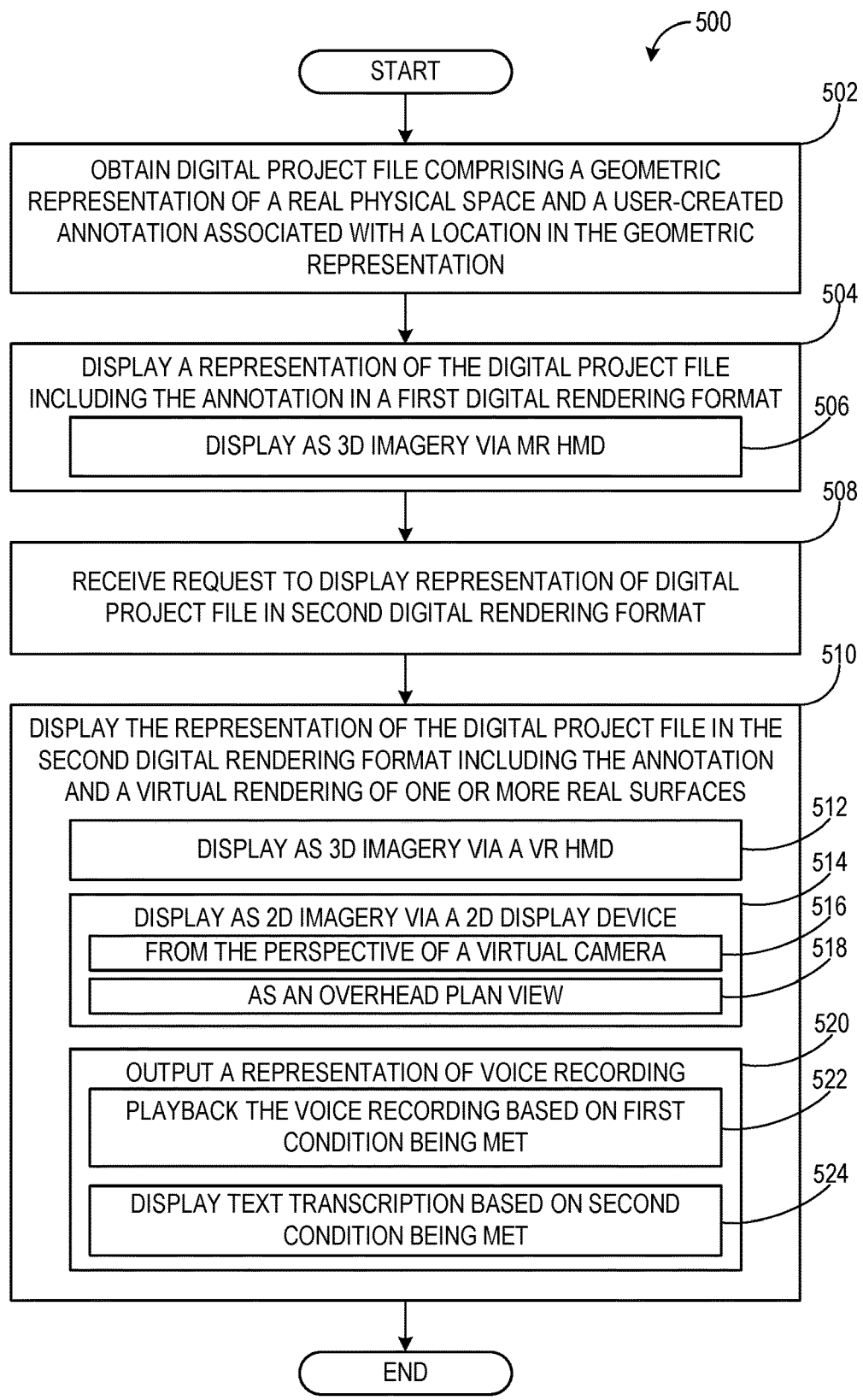
FIG. 5 shows a flowchart illustrating an example method of presenting different representations of a digital project file.

FIG. 5 shows a flowchart illustrating an example method 500 of presenting different representations of a digital project file. At 502, method 500 includes obtaining a digital project file comprising a geometric representation of a real physical space and a user-created annotation associated with a location in the geometric representation of the real physical space, the user-created annotation being displayable as an MR virtual image. The annotation may be associated with either a virtual object or a real object in the real physical space.

At 504, method 500 includes displaying a representation of the digital project file including the annotation in a first digital rendering format. For example, as indicated at 506, the digital project file including the annotation may be displayed as three-dimensional imagery via an MR head-mounted display device. In such a rendering, real surfaces may not be displayed as rendered virtual surfaces, but rather may be directly viewed through a see-through display as a real portion of a mixed reality image.

At 508, method 500 includes receiving a request to display a representation of the digital project file in a second digital rendering format in which one or more real surfaces of the real physical space are displayed as a virtual rendering, and at 510, in response to the request, displaying the representation of the digital project file in the second digital rendering format, wherein the representation includes the annotation and the virtual rendering of the one or more real surfaces. In this manner, a user viewing the proj ect file in a different environment than that in which it was created may still gain an understanding of the context of the annotation. The virtual rendering may utilize the geometric representation of the real physical space, e.g. a surface reconstruction mesh or rectangles mapped to the surface(s) in such a mesh, to form the virtual renderings of the surfaces, as described above. Where image data from the environment in which the project file was created is included in the project file, the image data may be included in the virtual rendering (e.g., applied as textures to the geometric representation), which may help to provide additional context for the annotation.

The representation in the second digital rendering format may be displayed on any suitable device. For example, the representation in the second digital rendering format may be displayed as three-dimensional imagery 512 via a virtual reality head-mounted display device, as or as two-dimensional imagery 514 via a two-dimensional display device. Where the digital project file is displayed as two-dimensional imagery, the two-dimensional imagery may be rendered in various different formats. As examples, the two-dimensional imagery may be rendered from the perspective of a virtual camera 516, or as an overhead plan view 518 (e.g. a printable view).

In some examples, an annotation may be output in different formats depending upon a detected condition compared to a policy regarding that condition. For example, as shown at 520 in the specific example of outputting a representation of a voice annotation, when a first condition is met 522 (e.g., a duration or length of a transcription of the voice recording being less than a threshold duration or length), the voice recording may be played back in audio form. Likewise, when a second condition is met 524 (e.g., the voice recording or transcription length meeting or exceeding the threshold), a text transcription of the voice recording may be displayed. It will be understood that any suitable condition may be used to vary an output mode selected for any suitable annotation format.

Figure 6:
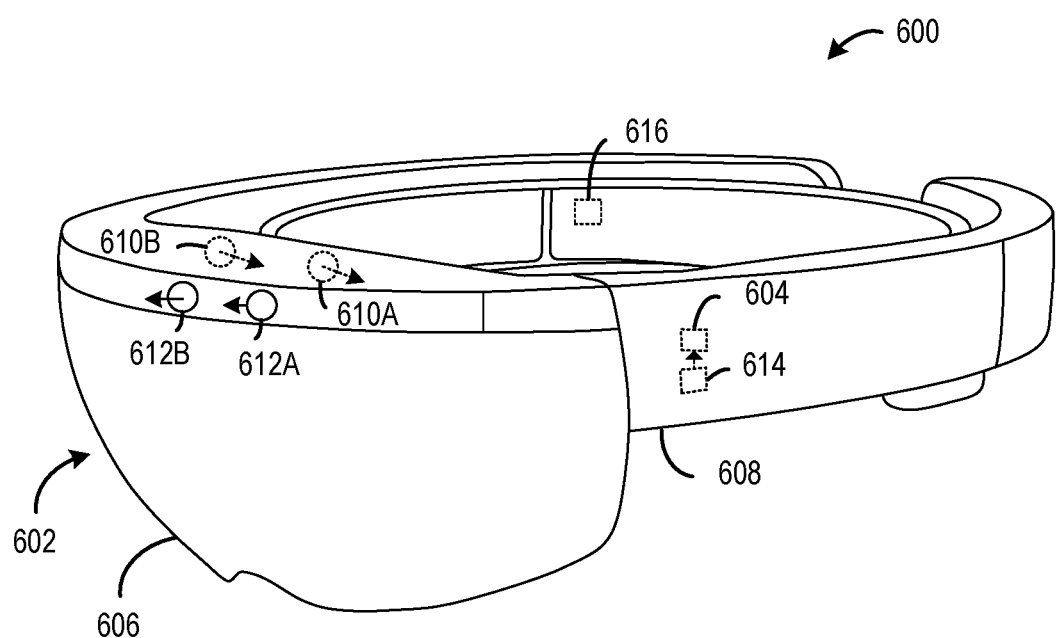
FIG. 6 shows an example head-mounted computing system.

FIG. 6 shows aspects of an example computing system 600 including a near-eye display 602. The computing system 600 is a non-limiting example of HMD devices 100 and 200, and may be used for displaying and modifying digital project files comprising virtual imagery. Computing system 600 may be implemented as computing system 700 shown in FIG. 7.

Computing system 600 may be configured to present any suitable type of virtual imagery experience. In some implementations, the experience includes a totally virtual experience in which the near-eye display 602 is opaque, such that the wearer is completely immersed in virtual-reality imagery provided via the near-eye display 602. In other implementations, the experience takes the form of a mixed-reality experience in which the near-eye display 602 is wholly or partially transparent from the perspective of the wearer, to give the wearer a view of the surrounding real-world physical space. The near-eye display 602 may direct display light to the user's eye(s) while light from the physical space passes through the near-eye display 602 to the user's eye(s). As such, the user's eye(s) simultaneously receive light from the physical environment and display light.

In such augmented-reality implementations, the computing system 600 may be configured to visually present augmented-reality objects that appear display-locked and/or world-locked. A display-locked augmented-reality object may appear to move along with a perspective of the user as a pose (e.g., six degrees of freedom (DOF): x, y, z, yaw, pitch, roll) of the computing system 600 changes. As such, a display-locked, augmented-reality object may appear to occupy the same portion of the near-eye display 602 and may appear to be at the same distance from the user, even as the user moves in the physical space. A world-locked, augmented-reality object may appear to remain in a fixed location in the physical space, even as the pose of the computing system 600 changes. In some examples, a world-locked object may appear to move in correspondence with movement of a real, physical object. In yet other examples, a virtual object may be displayed as body-locked, in which the object is located to an estimated pose of a user's body.

In some implementations, the opacity of the near-eye display 602 is controllable dynamically via a dimming filter. A substantially see-through display, accordingly, may be switched to full opacity for a fully immersive virtual-reality experience.

The computing system 600 may take any other suitable form in which a transparent, semi-transparent, and/or non-transparent display is supported in front of a viewer's eye(s). Further, implementations described herein may be used with any other suitable computing device, including but not limited to wearable computing devices, mobile computing devices, laptop computers, desktop computers, smart phones, tablet computers, etc.

Any suitable mechanism may be used to display images via the near-eye display 602. For example, the near-eye display 602 may include image-producing elements located within lenses 606. As another example, the near-eye display 602 may include a display device, such as a liquid crystal on silicon (LCOS) device or OLED microdisplay located within a frame 608. In this example, the lenses 606 may serve as, or otherwise include, a light guide for delivering light from the display device to the eyes of a wearer. Additionally or alternatively, the near-eye display 602 may present left-eye and right-eye mixed-reality images via respective left-eye and right-eye displays.

The computing system 600 includes an on-board computer 604 configured to perform various operations related to receiving user input (e.g., gesture recognition, eye gaze detection), visual presentation of mixed-reality images on the near-eye display 602, and other operations described herein. In some implementations, some to all of the computing functions described above, may be performed off board. Computer 604 may implement portions, or the entirety, of computing system 700 of FIG. 7, for example.

The computing system 600 may include various sensors and related systems to provide information to the on-board computer 604. Such sensors may include, but are not limited to, one or more inward facing image sensors 610A and 610B, one or more outward facing image sensors 612A and 612B, an inertial measurement unit (IMU) 614, and one or more microphones 616. The one or more inward facing image sensors 610A, 610B may be configured to acquire gaze tracking information from a wearer's eyes (e.g., sensor 610A may acquire image data for one of the wearer's eye and sensor 610B may acquire image data for the other of the wearer's eye). One or more such sensors may be used to implement a sensor system of HMD device 100, for example.

Where gaze-tracking sensors are included, the on-board computer 604 may be configured to determine gaze directions of each of a wearer's eyes in any suitable manner based on the information received from the image sensors 610A, 610B. The one or more inward facing image sensors 610A, 610B, and the on-board computer 604 may collectively represent a gaze detection machine configured to determine a wearer's gaze target on the near-eye display 602. In other implementations, a different type of gaze detector/sensor may be employed to measure one or more gaze parameters of the user's eyes. Examples of gaze parameters measured by one or more gaze sensors that may be used by the on-board computer 604 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 612A, 612B may be configured to measure physical environment attributes of a physical space. In one example, image sensor 612A may include one or more visible-light cameras (e.g. a stereo camera arrangement) configured to collect a visible-light image of a physical space. Additionally or alternatively, the image sensor 612B may include a depth camera configured to collect a depth image of a physical space. More particularly, in one example, the depth camera is an infrared time-of-flight depth camera. In another example, the depth camera is an infrared structured light depth camera.

Data from the outward facing image sensors 612A, 612B may be used by the on-board computer 604 to detect movements, such as gesture-based inputs or other movements performed by a wearer or by a person or physical object in the physical space. In one example, data from the outward facing image sensors 612A, 612B may be used to detect a wearer input performed by the wearer of the computing system 600, such as a gesture. Data from the outward facing image sensors 612A, 612B may be used by the on-board computer 604 to determine direction/location and orientation data (e.g., from imaging environmental features) that enables position/motion tracking of the computing system 600 in the real-world environment. In some implementations, data from the outward facing image sensors 612A, 612B may be used by the on-board computer 604 to construct still images and/or video images of the surrounding environment from the perspective of the computing system 600.

The IMU 614 may be configured to provide position and/or orientation data of the computing system 600 to the on-board computer 604. In one implementation, the IMU 614 may be configured as a three-axis or three-degree of freedom (3DOF) position sensor system. This example position sensor system may, for example, include three gyroscopes to indicate or measure a change in orientation of the computing system 600 within 3D space about three orthogonal axes (e.g., roll, pitch, and yaw).

In another example, the IMU 614 may be configured as a six-axis or six-degree of freedom (6DOF) position sensor system. Such a configuration may include three accelerometers and three gyroscopes to indicate or measure a change in location of the computing system 600 along three orthogonal spatial axes (e.g., x, y, and z) and a change in device orientation about three orthogonal rotation axes (e.g., yaw, pitch, and roll). In some implementations, position and orientation data from the outward facing image sensors 612A, 612B and the IMU 614 may be used in conjunction to determine a position and orientation (or 6DOF pose) of the computing system 600.

The computing system 600 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 616 may be configured to measure sound in the physical space. Data from the one or more microphones 616 may be used by the on-board computer 604 to recognize voice commands provided by the wearer to control the computing system 600.

The on-board computer 604 may include a logic device and a storage device, discussed in more detail below with respect to FIG. 7, in communication with the near-eye display 602 and the various sensors of the computing system 600.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
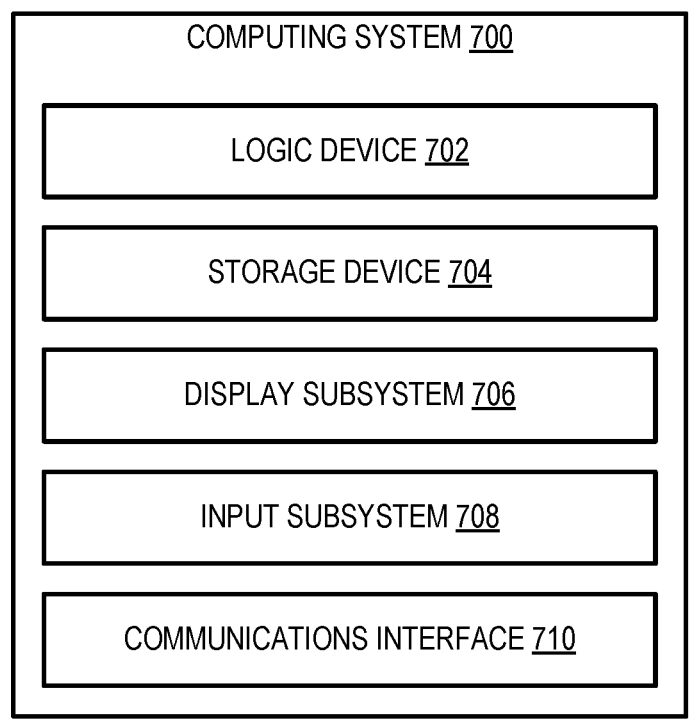
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic device 702 and a storage device 704. Computing system 700 may optionally include a display subsystem 706, input subsystem 708, communication subsystem 710, and/or other components not shown in FIG. 7.

Logic device 702 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 704 includes one or more physical devices configured to hold instructions executable by the logic device to implement the methods and processes described herein. When such methods and processes are implemented, the state of storage device 704 may be transformed—e.g., to hold different data.

Storage device 704 may include removable and/or built-in devices. Storage device 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 704 may include volatile, nonvolatile, dynamic, static, read/write, read-only, random-access, sequential-access, location-addressable, file-addressable, and/or content-addressable devices.

It will be appreciated that storage device 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 702 and storage device 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage device 704. This visual representation may take the form of a graphical user interface (GUI). As the herein described methods and processes change the data held by the storage device, and thus transform the state of the storage device, the state of display subsystem 706 may likewise be transformed to visually represent changes in the underlying data. Display subsystem 706 may include one or more display devices utilizing virtually any type of technology. Such display devices may be combined with logic device 702 and/or storage device 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing device comprising a logic device and a storage device holding instructions executable by the logic device to obtain a digital project file, the digital project file comprising a geometric representation of a real physical space, and a user-created annotation associated with a location in the geometric representation of the real physical space, display a representation of the digital project file in a first digital rendering format, receive a request to display a representation of the digital project file in a second digital rendering format in which one or more real surfaces of the real physical space are displayed as a virtual rendering, the one or more real surfaces not being displayed as the virtual rendering the first digital rendering format, and in response to the request, display the representation of the digital project file including the annotation in the second digital rendering format. In such an example, the instructions alternatively or additionally may be executable to display the representation of the digital project file in the first digital rendering format as three-dimensional imagery via a mixed reality head-mounted display device. In such an example, the instructions alternatively or additionally may be executable to display the representation of the digital project file in the second digital rendering format as three-dimensional imagery via a virtual reality head-mounted display device. In such an example, the instructions alternatively or additionally may be executable to display the representation of the digital project file in the second digital rendering format as two-dimensional imagery via a two-dimensional display device. In such an example, the instructions alternatively or additionally may be executable to display the representation of the digital project file in the second digital rendering format as a plan view. In such an example, the plan view alternatively or additionally may comprise a representation of the annotation. In such an example, the digital project file alternatively or additionally may comprise image data that is spatially associated with the geometric representation of the real physical space, and the one or more real surfaces of the real physical space may be displayed using the image data. In such an example, the instructions alternatively or additionally may be executable to display the representation of the digital project file in the second digital rendering format from the perspective of a virtual camera. In such an example, the digital project file alternatively or additionally may comprise a virtual object associated with a location in the geometric representation of the real physical space, and the virtual object may be displayable as a mixed reality virtual image. In such an example, the annotation alternatively or additionally may be associated with the virtual object. In such an example, the annotation alternatively or additionally may comprise a control selectable to output a representation of a voice recording. In such an example, the instructions executable to output the representation of the voice recording alternatively or additionally may be executable to, when the voice recording meets a first condition, playback the voice recording, and, when the voice recording meets a second condition, display a text transcription of the voice recording.

Another example provides, on a computing device, a method comprising obtaining a digital project file, the digital project file comprising a geometric representation of a real physical space, and a user-created annotation associated with a location in the geometric representation of the real physical space, displaying a representation of the digital project file in a first digital rendering format, receiving a request to display a representation of the digital project file in a second digital rendering format in which one or more real surfaces of the real physical space are displayed as a virtual rendering, the one or more real surfaces not being displayed as the virtual rendering the first digital rendering format, and in response to the request, displaying the representation of the digital project file in the second digital rendering format including the annotation, wherein one or more real surfaces of the real physical space are displayed as a virtual rendering in the second digital rendering format and not in the first digital rendering format. In such an example, the representation of the digital project file in the first digital rendering format alternatively or additionally may be displayed on a see-through display device. In such an example, the representation of the digital project file in the first digital rendering format alternatively or additionally may be displayed on an opaque display device. In such an example, the digital project file further alternatively or additionally may comprise image data that is spatially associated with the geometric representation of the real physical space, and the one or more real surfaces of the real physical space may be displayed as the virtual rendering using the image data in the second digital rendering format. In such an example, the annotation alternatively or additionally may comprise a control selectable to output a representation of a voice recording. In such an example, outputting the representation of the voice recording alternatively or additionally may comprise, when the voice recording meets a first condition, playing back the voice recording, and when the voice recording meets a second condition, displaying a text transcription of the voice recording.

Another example provides a computing device comprising a logic device and a storage device holding instructions executable by the logic device to obtain a digital project file, the digital project file comprising a geometric representation of a real physical space, and a user-created annotation associated with a location in the geometric representation of the real physical space, receive a request to display a representation of the digital project file, based on a first condition, present the annotation in a first annotation format, and based on a second condition that is different from the first condition, present the annotation in a second annotation format. In such an example, the instructions executable to present the annotation in the first annotation format alternatively or additionally may be executable to playback a voice recording associated with the annotation, and the instructions executable to present the annotation in the second annotation format alternatively or additionally may be executable to display a text transcription of the voice recording.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic device comprising a processor; and
a storage device holding instructions executable by the processor to
obtain a digital project file, the digital project file comprising
a geometric representation of a real physical space, and
a user-created annotation associated with a location in the geometric representation of the real physical space;
display a representation of the digital project file in a first digital rendering format;
receive a request to display a representation of the digital project file in a second digital rendering format in which one or more real surfaces of the real physical space are displayed as a virtual rendering, the one or more real surfaces not being displayed as the virtual rendering in the first digital rendering format; and
in response to the request, display the representation of the digital project file including the annotation in the second digital rendering format.

2. The computing device of claim 1, wherein the instructions are executable to display the representation of the digital project file in the first digital rendering format as three-dimensional imagery via a mixed reality head-mounted display device.

3. The computing device of claim 1, wherein the instructions are executable to display the representation of the digital project file in the second digital rendering format as three-dimensional imagery via a virtual reality head-mounted display device.

4. The computing device of claim 1, wherein the instructions are executable to display the representation of the digital project file in the second digital rendering format as two-dimensional imagery via a two-dimensional display device.

5. The computing device of claim 4, wherein the instructions are executable to display the representation of the digital project file in the second digital rendering format as a plan view.

6. The computing device of claim 5, wherein the plan view comprises a representation of the annotation.

7. The computing device of claim 1, wherein the digital project file further comprises image data that is spatially associated with the geometric representation of the real physical space, and wherein the one or more real surfaces of the real physical space are displayed using the image data.

8. The computing device of claim 1, wherein the instructions are executable to display the representation of the digital project file in the second digital rendering format from the perspective of a virtual camera.

9. The computing device of claim 1, wherein the digital project file further comprises a virtual object associated with a location in the geometric representation of the real physical space, the virtual object being displayable as a mixed reality virtual image.

10. The computing device of claim 9, wherein the annotation is associated with the virtual object.

11. The computing device of claim 1, wherein the annotation further comprises a control selectable to output a representation of a voice recording.

12. The computing device of claim 11, wherein the instructions executable to output the representation of the voice recording are executable to
when the voice recording meets a first condition, playback the voice recording, and
when the voice recording meets a second condition, display a text transcription of the voice recording.

13. On a computing device, a method, comprising:
obtaining a digital project file, the digital project file comprising
a geometric representation of a real physical space, and
a user-created annotation associated with a location in the geometric representation of the real physical space;
displaying a representation of the digital project file in a first digital rendering format;
receiving a request to display a representation of the digital project file in a second digital rendering format in which one or more real surfaces of the real physical space are displayed as a virtual rendering, the one or more real surfaces not being displayed as the virtual rendering in the first digital rendering format; and
in response to the request, displaying the representation of the digital project file in the second digital rendering format including the annotation, wherein one or more real surfaces of the real physical space are displayed as a virtual rendering in the second digital rendering format and not in the first digital rendering format.

14. The method of claim 13, wherein the representation of the digital project file in the first digital rendering format is displayed on a see-through display device.

15. The method of claim 13, wherein the representation of the digital project file in the first digital rendering format is displayed on an opaque display device.

16. The method of claim 13, wherein the digital project file further comprises image data that is spatially associated with the geometric representation of the real physical space, and wherein the one or more real surfaces of the real physical space are displayed as the virtual rendering using the image data in the second digital rendering format.

17. The method of claim 13, wherein the annotation further comprises a control selectable to output a representation of a voice recording.

18. The method of claim 17, wherein outputting the representation of the voice recording comprises,
when the voice recording meets a first condition, playing back the voice recording, and
when the voice recording meets a second condition, displaying a text transcription of the voice recording.

19. A computing device, comprising:
a logic device comprising a processor; and
a storage device holding instructions executable by the processor to
obtain a digital project file, the digital project file comprising
a geometric representation of a real physical space, and
a user-created annotation associated with a location in the geometric representation of the real physical space;

receive a request to display a representation of the digital project file;

based on the computing device being a first device type, present the annotation in a first annotation format within the geometric representation of the real physical space; and based on the computing device being a second device type that is different from the first device type, present the annotation in a second annotation format within the geometric representation of the real physical space.

20. The computing device of claim 19, wherein the instructions executable to present the annotation in the first annotation format are executable to playback a voice recording associated with the annotation, and wherein the instructions executable to present the annotation in the second annotation format are executable to display a text transcription of the voice recording.

\* \* \* \* \*